United States Patent
Reeves

(10) Patent No.: US 8,930,089 B2
(45) Date of Patent: Jan. 6, 2015

(54) SYSTEM AND METHOD FOR INDICATING TO A REMOTE LOCATION OPERATION OF AN AUGER OR THE LIKE

(76) Inventor: Barry H. Reeves, Union City, TN (US)

( * ) Notice: Subject to any disclaimer, the term of this patent is extended or adjusted under 35 U.S.C. 154(b) by 332 days.

(21) Appl. No.: 13/169,934

(22) Filed: Jun. 27, 2011

(65) Prior Publication Data

US 2012/0017556 A1 Jan. 26, 2012

Related U.S. Application Data

(63) Continuation-in-part of application No. 12/535,476, filed on Aug. 4, 2009, now Pat. No. 7,983,821, which is a continuation of application No. 11/420,395, filed on May 25, 2006, now abandoned.

(51) Int. Cl.
- *G05D 3/00* (2006.01)
- *A01D 41/12* (2006.01)
- *E02F 9/26* (2006.01)

(52) U.S. Cl.
CPC .............. *A01D 41/1217* (2013.01); *E02F 9/26* (2013.01)
USPC .................................. 701/50; 701/52; 701/53

(58) Field of Classification Search
USPC ........ 701/50, 52, 53; 198/312, 313, 317, 412, 198/413, 417, 502.1, 657, 674, 612, 613, 198/812, 813, 817
See application file for complete search history.

(56) References Cited

U.S. PATENT DOCUMENTS

| | | | |
|---|---|---|---|
| 3,452,885 A * | 7/1969 | Love | 414/345 |
| 3,583,405 A * | 6/1971 | Gerhardt et al. | 460/1 |
| 3,669,291 A * | 6/1972 | De Coene | 414/502 |
| 4,286,530 A * | 9/1981 | Conley | 111/200 |
| 4,893,241 A * | 1/1990 | Girodat et al. | 701/50 |
| 5,011,359 A * | 4/1991 | McDonald | 414/289 |
| 5,046,362 A * | 9/1991 | Strubbe | 73/579 |
| 5,051,874 A * | 9/1991 | Guss | 362/89 |
| 5,156,570 A * | 10/1992 | Justice, III | 460/118 |
| 5,518,453 A * | 5/1996 | Tribbett | 460/1 |
| 5,586,033 A * | 12/1996 | Hall | 701/50 |
| 5,904,365 A * | 5/1999 | Dillon | 280/419 |
| 5,978,720 A * | 11/1999 | Hieronymus et al. | 701/31.4 |
| 5,986,559 A * | 11/1999 | Larson | 340/672 |
| 6,097,425 A * | 8/2000 | Behnke et al. | 348/89 |
| 6,208,255 B1 * | 3/2001 | Conrad et al. | 340/606 |
| 6,282,476 B1 * | 8/2001 | Hieronymus et al. | 701/50 |
| 6,346,888 B1 * | 2/2002 | Conrad et al. | 340/606 |
| 6,553,300 B2 * | 4/2003 | Ma et al. | 701/50 |
| 6,661,338 B2 * | 12/2003 | Holthaus | 340/309.16 |
| 6,690,285 B2 * | 2/2004 | Schafer et al. | 340/684 |
| 6,820,459 B2 * | 11/2004 | Beck et al. | 73/1.16 |
| 6,943,824 B2 * | 9/2005 | Alexia et al. | 348/89 |
| 6,980,896 B2 * | 12/2005 | Stamerra | 701/50 |
| 7,034,666 B2 * | 4/2006 | Knutson | 340/431 |
| 2001/0040084 A1 * | 11/2001 | Tofin et al. | 198/671 |

(Continued)

*Primary Examiner* — Khoi Tran
*Assistant Examiner* — Jorge Peche
(74) *Attorney, Agent, or Firm* — Moore & Van Allen PLLC; W. Kevin Ransom

(57) ABSTRACT

The systems and methods of the present invention employ either a sensor in communication with the auger or a sensor in the form of a switch operated by the user of the auger. When the sensor detects that the auger is operating or the switch is operated by the auger operator, an indication of auger operation is published to a remote location. The indication may be in the form of an aural or visual indication or in the form of a wireless transmission.

6 Claims, 7 Drawing Sheets

(56) References Cited

U.S. PATENT DOCUMENTS

2003/0169176 A1* 9/2003 Schafer et al. ............... 340/684
2003/0174207 A1* 9/2003 Alexia et al. .................... 348/89
2004/0013506 A1* 1/2004 Guhr et al. ..................... 414/526
2006/0045701 A1* 3/2006 Dillon ............................ 414/526

* cited by examiner

SYSTEM AND METHOD FOR INDICATING TO A REMOTE LOCATION OPERATION OF AN AUGER OR THE LIKE

CROSS-REFERENCE TO RELATED APPLICATIONS

The present application is a continuation-in-part of U.S. patent application Ser. No. 12/535,476, filed Aug. 4, 2009 and entitled SYSTEM AND METHOD FOR INDICATING TO A REMOTE LOCATION OPERATION OF AN AUGER OR THE LIKE, which in turn is a continuation of U.S. patent application Ser. No. 11/420,395, filed May 25, 2006 and entitled, SYSTEM AND METHOD FOR INDICATING TO A REMOTE LOCATION OPERATION OF AN AUGER OR THE LIKE, the contents of both of are incorporated herein by reference.

BACKGROUND OF THE INVENTION

1. Field of the Invention

The present invention relates to systems and methods for providing an indication to a remote location regarding operation of an augur, such as an augur used in a harvest combine or the like.

2. Description of the Related Art

A common method for moving grain, soil, liquids, etc. from one container to another is an auger. An auger comprises a helical shaft located in a tube or housing. As the shaft is rotated, material, such as grain, is transported by the shaft along the wall of the housing and distributed into a container at an opening in the housing of the auger.

In many instances, it is important to provide indications of auger operation to a remote user. For example, where an auger is used to redistribute material from one container to another, the auger should be monitored to ensure it does not overfill the receiving container. Further, in some instances, it is important to not completely empty the container from which material is being drawn. Where an auger is used to fill several smaller containers from a larger container, it is important to monitor when the auger is not in operation for switching out receiving containers so that material meted out by auger is not wasted.

FIG. 1 illustrates one example of the importance of providing a remote indication of auger operation. A harvest combine 10 is in operation separating grain from plants and depositing the grain in a container 12 associated with the combine 10. The combine 10 further includes an auger 14 for removing grain from the container 12 into a truck, buggy, boxcar, or other similar hauler. As illustrated, the combine is emptying the grain into a buggy 16 being pulled by a tractor 18. In the present example, a driver positions the buggy near the combine and grain is dispensed into the buggy as the combine and buggy are driven. In this manner, the combine can continue to harvest grain while also transferring grain to the buggy.

As is readily apparent, knowledge of when the auger is in operation is important for operation of the tractor and buggy. The operator should maintain the buggy under the outlet of the auger when the auger is dispensing grain, so that the grain does not fall to the ground. When the auger is not in operation, the operator can safely remove the buggy from under the auger to haul the grain away. FIG. 1 is just one example of the many instances where remote indication of auger operation is important.

In conventional systems, communications concerning auger operation have been rudimentary at best. In the example of FIG. 1, information concerning auger operation is typically in the form of visual or oral communication between the operator of the combine and the operator of the tractor. This is a highly disadvantageous form of communication, as it requires eye contact between the operators, which is difficult given that both the combine and tractor are typically moving and constantly altering course, dust and glare, and predawn and/or after dark operation of the vehicles. As such, systems and methods are needed to provide a more reliable indication of auger operation to a remote location.

BRIEF SUMMARY OF THE INVENTION

The present invention provides systems and methods that overcome the above, as well as other disadvantages noted with prior art auger systems. Specifically, systems and methods of the present invention provide an indication to a remote location of auger operation.

The systems and methods of the present invention employ either a sensor in communication with the auger or a sensor in the form of a switch operated by the user of the auger. When the sensor detects that the auger is operating or the switch is operated by the auger operator, an indication of auger operation is published to a remote location. The indication may be in the form of an aural or visual indication or in the form of a wireless transmission.

For example, in one embodiment, the systems and methods of the present invention employ a switch connected to the drive mechanism of the auger. The switch is transitioned between the "on" and "off" position by operation of the drive mechanism. When the drive mechanism is engaged to operate the auger, the switch is transitioned between states. In this embodiment, the switch controls operation of a light located in conspicuous location. By studying the light from a remote location, one can determine operation of the auger. Alternatively, the switch could be associated with a speaker, display, or a wireless communication system for indicating to a remote location operation of the auger.

In an alternative embodiment, the sensor of the present invention is associated with the controls of the auger. When the auger is controlled to operate, this is detected by the sensor, which in turn, provides an indication to a remote location. In still further embodiments, the sensor may be a switch that is operated by the auger operator. The sensor could be a flow meter located in the auger or a sensor for sensing rotation of the helical shaft of the auger, or any other type of system that detects operation of the auger.

The indicator for providing a remote indication of auger operation may also take many forms. In some embodiments, the indicator is a light, display, and/or speaker for providing either visual and/or aural indications. Alternatively, the indicator could be a wireless transmitter or transceiver for transmitting wireless communications, such as radio frequency RF or infrared IR. In the embodiments where a wireless transmitter or transceiver is employed at the auger, the remote location will include a receiver or transceiver for receiving the wireless communications and providing an indication to the remote operator.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
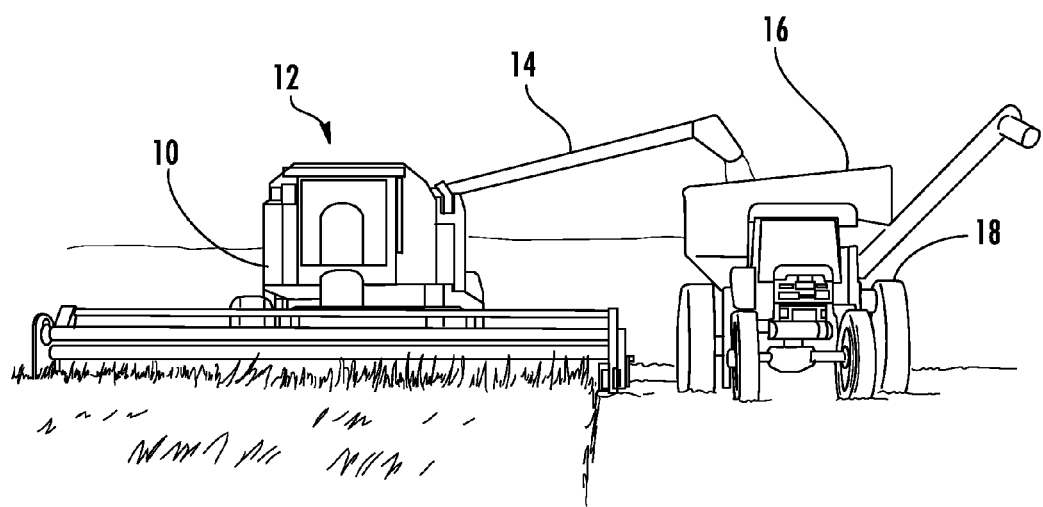
FIG. 1 is an illustration of an auger system in operation according to the prior art.
Figure 2A:
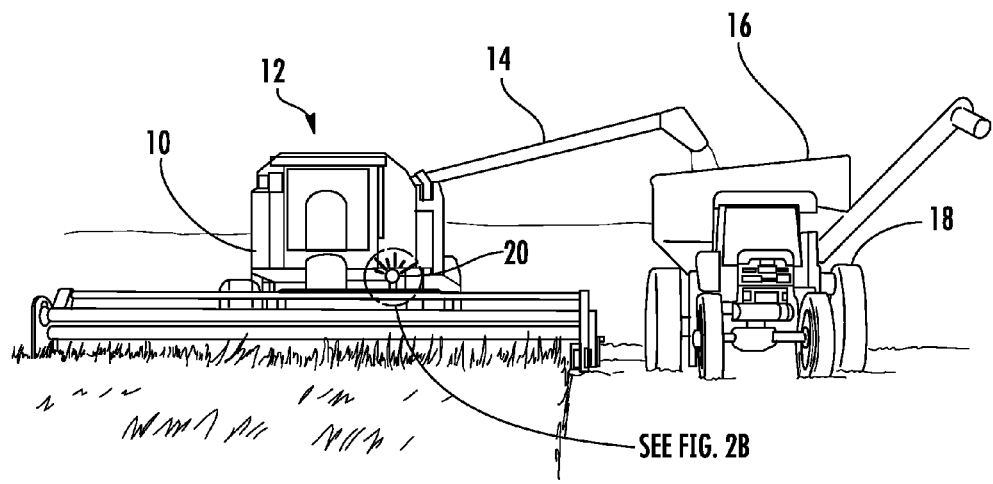
FIG. 2A is an illustration of a system according to one embodiment of the present invention implemented in the auger system of FIG. 1.
Figure 2B:
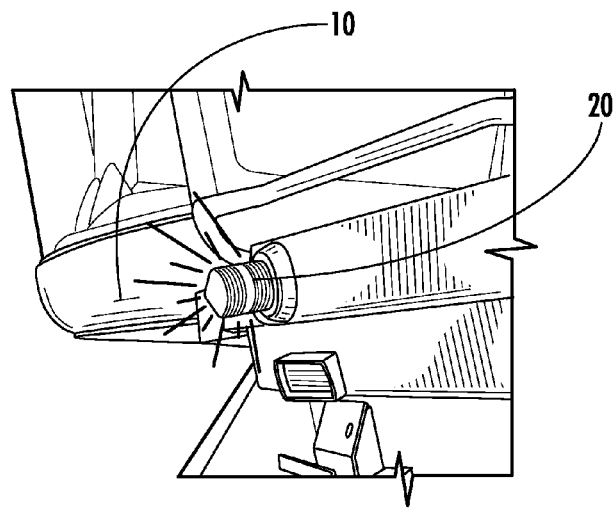
FIG. 2B is an exploded view of a portion of the indicator of the system of FIG. 2A according to one embodiment of the present invention.

FIGS. 2A and 2B are illustrations of the systems and methods of the present invention employed in the auger system depicted in FIG. 1. Similar to FIG. 1, FIG. 2A illustrates the harvest combine 10 dispensing grain into the buggy 16. However, FIG. 2 further illustrates an indicator 20 according to one embodiment of the present invention providing an indication to a remote location that the auger is in operation. As can be appreciated, using the systems and methods of the present invention a remote operator can more easily determine the operation of the auger and ensure that the buggy, grain truck, box car, or other type of receiving container is positioned under the auger during its operation.

Figure 3A:
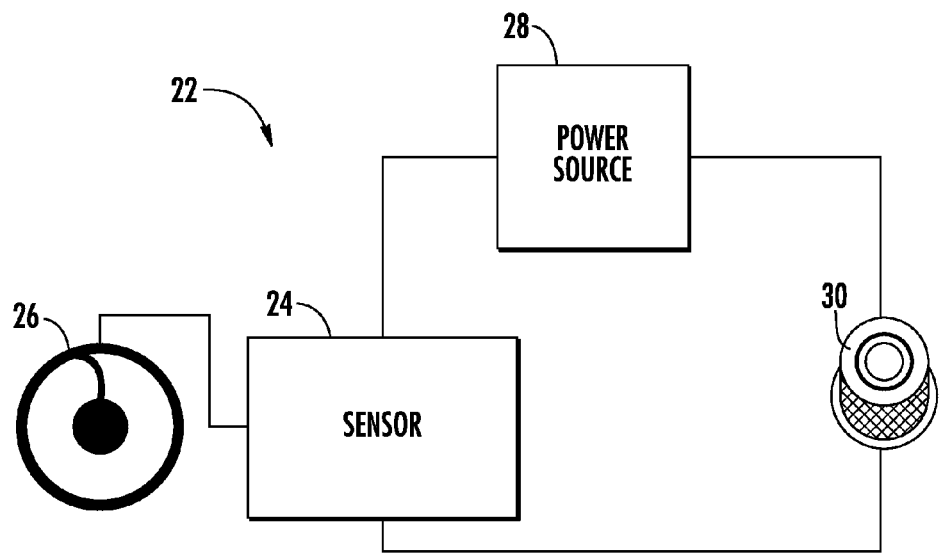
FIG. 3A is a simplified block diagram of a system according to one embodiment of the present invention that uses a visual indicator to remotely indicate auger operation.

FIG. 3A is a simplified block diagram illustrating the various components of a system 22 according one embodiment of the present invention. In this embodiment, the system includes a sensor 24 in communication with an auger 26. The sensor is connected in series with a power source 28 and a light 30. The sensor 24 is either a switch or associated with a switch for controlling flow of current from the power source to the light. The light is mounted in a conspicuous location to provide a remote indication of the auger operation. When the sensor senses that the auger is in operation, it closes the switch allowing current flow to the light, which is then illuminated. When the sensor senses that the auger is not in operation, it opens the switch cutting off current flow to the light so that the light is not illuminated.

Figure 3B:
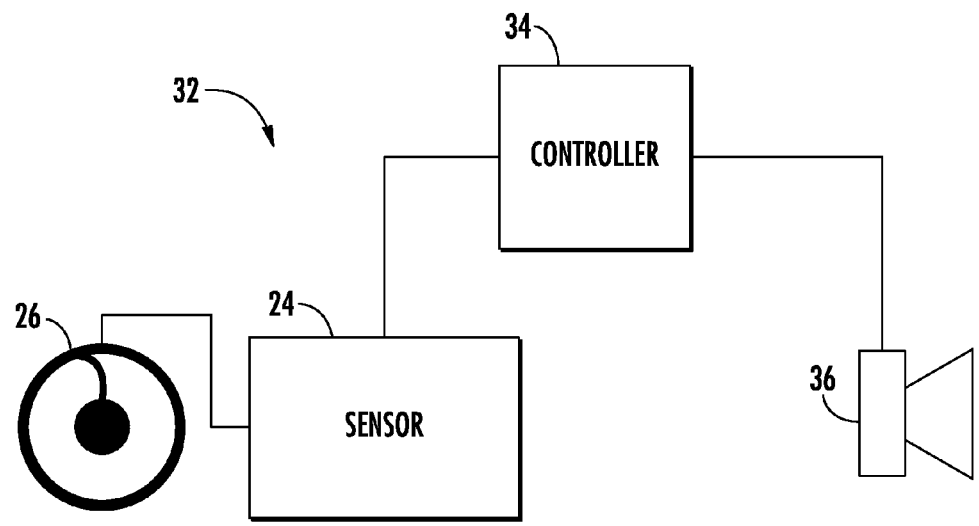
FIG. 3B is a simplified block diagram of a system according to one embodiment of the present invention that uses an aural indicator to remotely indicate auger operation.

FIG. 3B is a simplified block diagram illustrating the various components of a system 32 according another embodiment of the present invention. In this embodiment, the system includes a sensor 24 in communication with an auger 26. Connected to the sensor is a controller 34, which is, in turn, connected to a speaker 36. When the sensor senses that the auger is in operation, a signal is sent to the controller. The controller then operates the speaker to provide either a constant or periodic audible sound. When the sensor senses that the auger is not in operation, the controller does not sound the speaker. Alternatively, the controller could be connected to a display for providing visual indication of auger operations to a user.

Figure 3C:
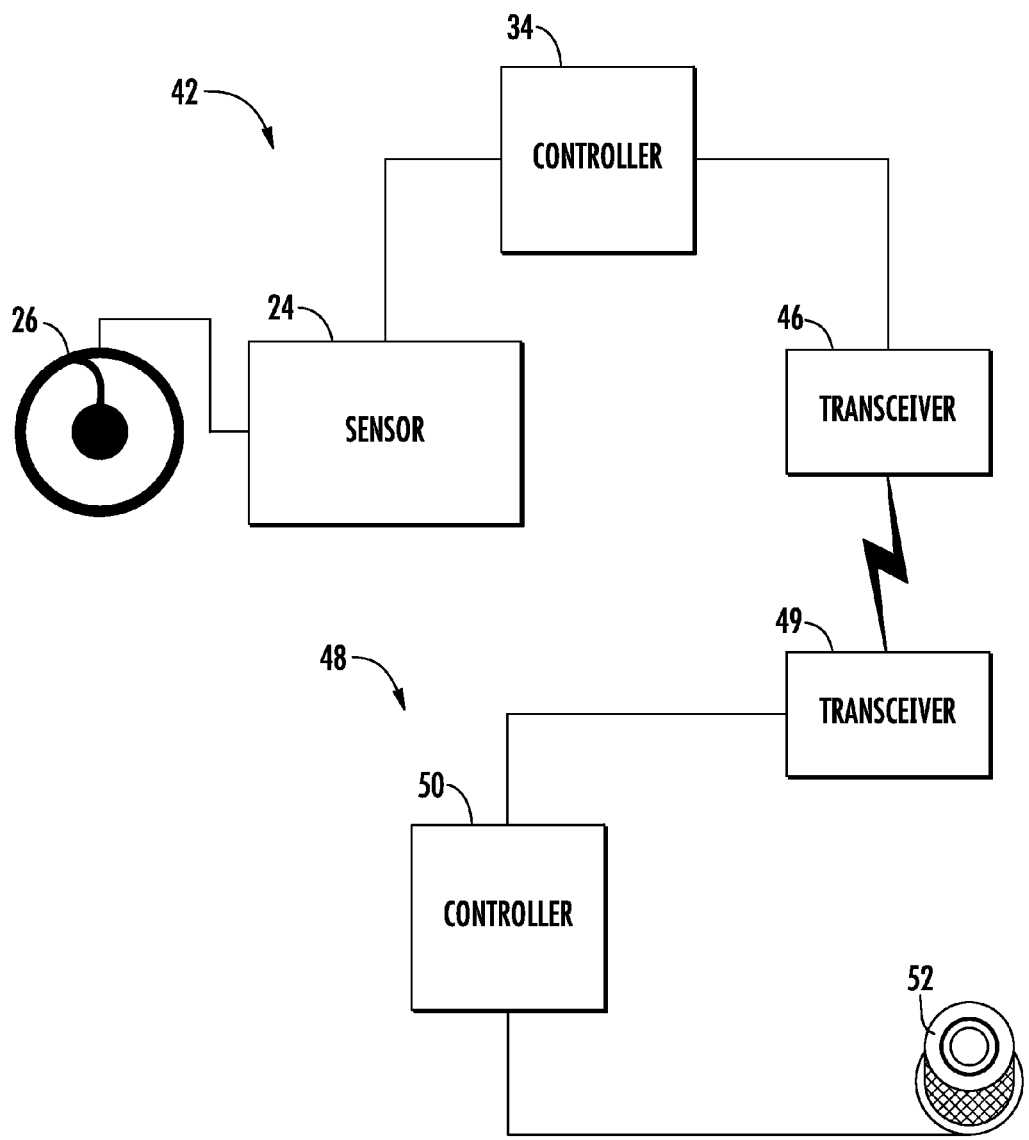
FIG. 3C is a simplified block diagram of a system according to one embodiment of the present invention that uses wireless communications to remotely indicate auger operation.

FIG. 3C is a simplified block diagram illustrating the various components of a system 42 according another embodiment of the present invention. In this embodiment, the system includes a sensor 24 in communication with an auger 26. Connected to the sensor is a controller 36, which is, in turn, connected to a transmitter or transceiver 46, such as an RF or infrared transceiver. When the sensor senses that the auger is in operation, a signal is sent to the controller. The controller then operates the transceiver to transmit a wireless signal.

In this embodiment, the remote location 48 comprises a receiver or transceiver 48 connected to a controller 50, which, in turn, is connected to an indicator 52. The indicator 52 can be a light, speaker, display, etc. When the signal transmitted by the system 42 is received at the remote location, the controller 50 operates the indicator 52 to provide an indication to a remote user that the auger is in operation. While not shown, in embodiments where the indicator is a light, the system of the present invention may include a blinker device for intermittently providing a signal to the indicator to thereby cause the indicator to blink. Use of a blinking indicator may be advantageous to draw the user's attention, especially where various other lights may be operating on the auger or combine.

Figure 4:
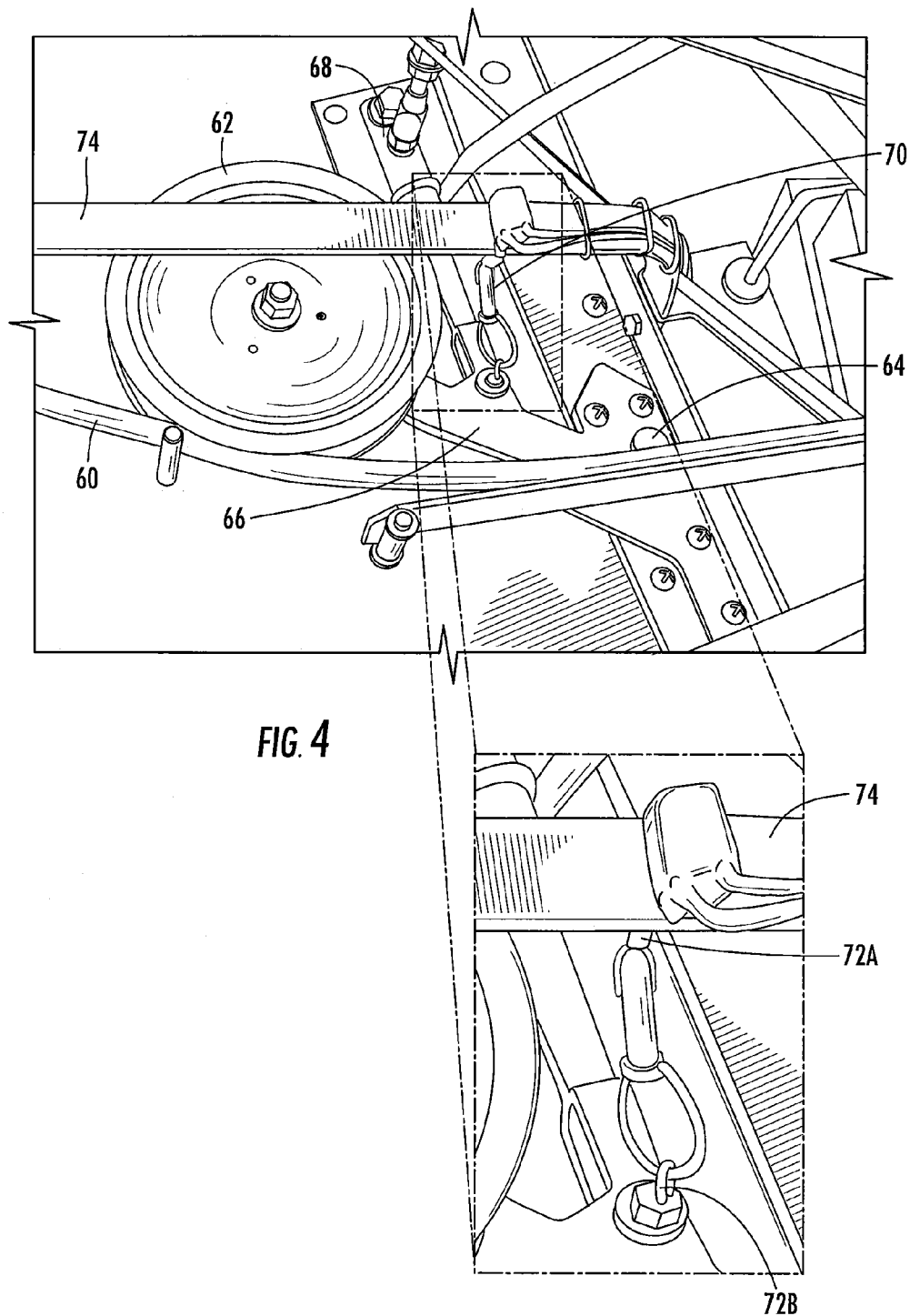
FIG. 4 illustrates location of a sensor of the system on the auger drive mechanism according to one embodiment of the present invention.

FIG. 4 discloses a unique location for a sensor for sensing auger operation according to one embodiment of the present invention. FIG. 4 illustrates an auger drive mechanism in the form of a belt 60 and pulley 62 used to rotate the shaft of the auger, not shown. The pulley is connected to a stationary pivot point 64 via a pivot arm 66. Connected to the pivot arm is a hydraulic piston 68. The hydraulic arm is operated to selectively engage and disengage the auger. In an extended position, the hydraulic piston 68 rotates the pulley 62 into contact with the belt 60. In this position, the belt drives the shaft of the auger. In a retracted position, the hydraulic piston 68 rotates the pulley 62 away from contact with the belt 60. In this position, the auger is not in operation.

As illustrated, in this embodiment of the invention, a sensor in the form of a contact switch 70 is located relative to the pivot arm 66. A first portion 72a of the switch is connected to a stationary arm 74, while a second portion 72b of the switch is connected to the pivot arm 66. The switch is configured such that the contacts are separated from each other when the switch is in a non-extended state, but are brought into contact with each other when the first and second portions of the switch are extended relative to each other. An example would be a toggle switch which is spring loaded to the off position. When the pivot arm is extended, the switch contacts are closed. When the pivot arm is retracted, the spring loaded switch return to the off position. With reference to FIGS. 3A-3C, the switch 70 of this embodiment may be connected in any of the configurations disclosed in these figures for providing a remote indication of auger operation.

Returning to FIG. 4, location of the switch 70 relative to the auger drive mechanism provides an accurate method of detecting auger operation. When ever the auger is engaged, the switch is activated. Thus, automatic detection of auger operation is achieved without requiring input from the auger operator.

Figure 5:
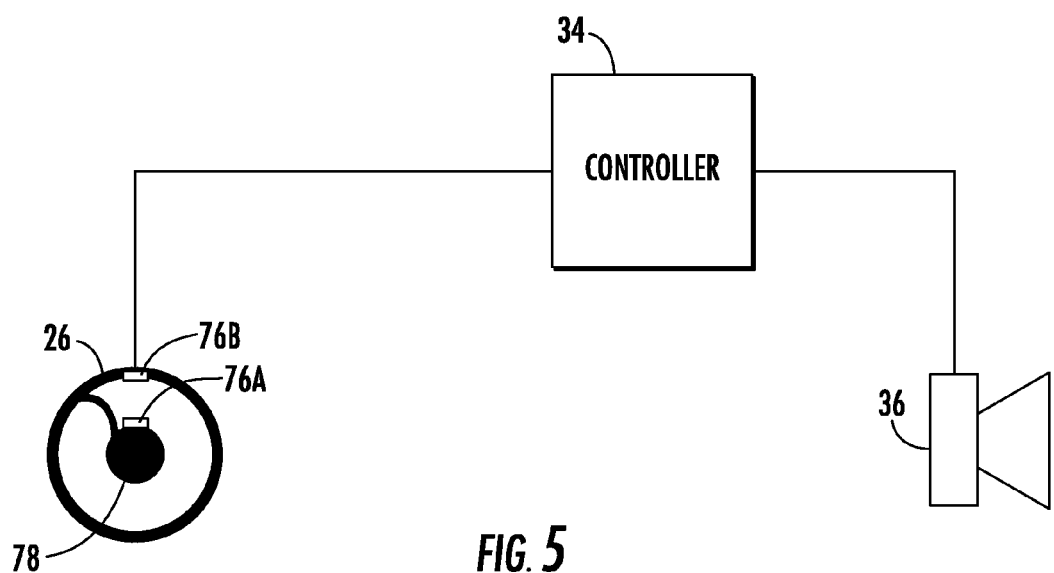
FIG. 5 illustrates a sensor for sensing rotation of the shaft of the auger according to one embodiment of the present invention.

FIG. 5 illustrates another sensor that may be used in the various embodiments illustrated in FIGS. 3A-3C. In this embodiment, the sensor comprises a reflector 76a coupled to the shaft 78 of the auger 26. Spaced away from the reflector is an optical transceiver 76b. The optical transceiver emits an optical beam directed at the shaft. When the shaft is rotating, the reflector 76a will periodically come in to contact and reflect the optical beam back to the transceiver, thereby indicating that the shaft is rotating. This embodiment of the sensor may be further used to indicate the rotational speed of the shaft. As the shaft rotates faster, the transceiver will receive more frequent instances of the reflected optical beam. If the sensor is connected to a light (such as in FIG. 3A) or a speaker (such as in FIG. 3B), the higher frequency of the "on" and "off" times of the visual or audible signal will indicate to a remote user the rotation speed of the shaft. In the instance that such a sensor is used in conjunction with the system of FIG. 3C, the speed of the shaft could be displayed to the user using known speed conversion techniques.

Figure 6:
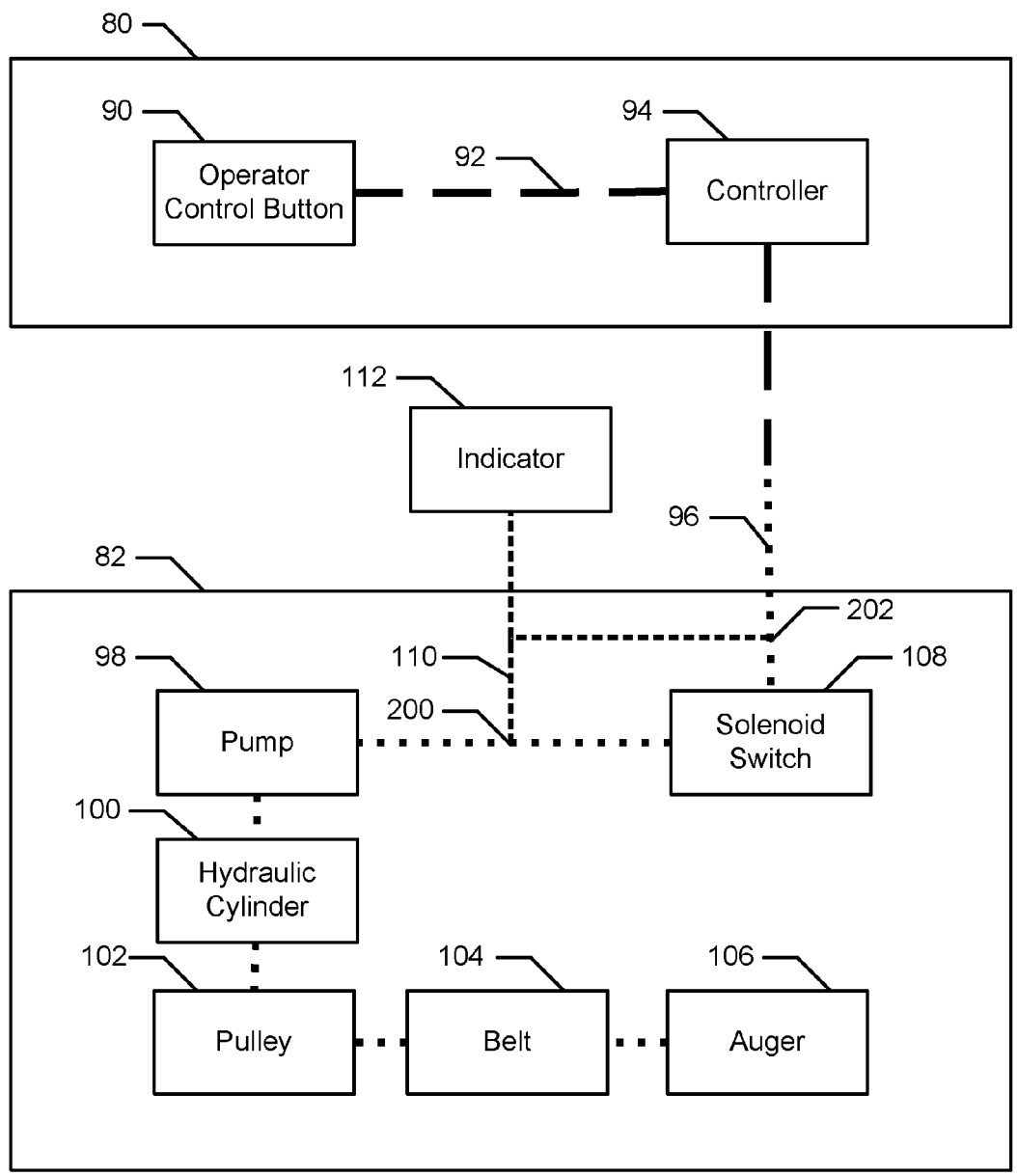
FIG. 6 illustrates location of a sensor of the system on the auger drive mechanism according to another embodiment of the present invention.

FIG. 6. illustrates another embodiment where the indicator is connected to the power line that supplies the auger drive mechanism at a position on the power line adjacent to the connection of the power line to the drive mechanism. As illustrated, the combine has both a cabin section 80 and an auger drive mechanism section 82. The cabin section houses an operator control button 90 and a command signal line 92. The operator control button may comprise a button, switch, lever or similar device. Optionally, the cabin section may house a controller 94 and associated electronics that control delivery of power to the drive mechanism section upon receipt of a signal from the operator control button. The drive mechanism section comprises the pump power line 96 for delivering power to a pump 98. Downstream from the pump, the drive mechanism section may include drive mechanism devices including a hydraulic cylinder 100, a pulley 102, a belt 104 and an auger 106. The drive mechanism section optionally houses a solenoid switch 108 adjacent to the pump. A second power line 110 bridges a connection between the pump power line and an indicator 902 that is adjacent to the pump or solenoid.

This embodiment operates as follows. The auger operator activates the auger via operator control button 90 located in the cabin section of the combine 80. The operator control button sends a signal down the command signal line 92, which may comprise a hot wire and a ground wire that are connected to a controller 94 that is also located in the cabin section of the combine. Based on this signal, the controller applies power via the power line 96 to the pump 98, which, in turn, controls the hydraulic cylinder 100. A pulley 102 is connected to the hydraulic cylinder such that when the pump activates the hydraulic cylinder the pulley is engaged with a belt 104 that drives the auger 106. Optionally, a solenoid switch 108 may be located on the pump power line upstream from the pump.

As further illustrated, a second power line 110 is connected to the pump power line. The power travels down the second power line and powers an indicator 112 that notifies a hauler or buggy that the auger is in operation. The indicator may comprise a visual indicator such as a light, an audio indicator such as a speaker, or a wireless indicator such as a radio-frequency transmitter.

The pick-off point 200, marking the node where the second power line connects to the pump power line, may be located in between the solenoid and the pump. Thus, at point 200 the second power line is adjacent to the pump and is downstream from the controller in the cabin section. Or, the pick-off point 202 may be located on the pump power line and receive the signal from the cabin section of the combine before both the solenoid and the pump. Thus, at point 202 the second power line is adjacent to the solenoid—which is in turn adjacent to the pump—and is downstream from the controller in the cabin section.

Locating the pick-off point 200 on the pump power line adjacent to the pump and downstream from the cabin section is beneficial as it provides a reliable indication that power has reached the drive mechanism. Similarly, locating 202 on the pump power line adjacent to the solenoid switch—which is in turn adjacent to the pump 98—provides a reliable indication that the signal initiated by the operator control button has successfully traversed the combine's electronics and is a power signal that has reached the auger's drive mechanism. By contrast, locating the pick-off point on the command signal line upstream from the drive mechanism in the cabin section—i.e., adjacent to the operator control button 90 or controller 94—can be problematic: while the signal may pass through the second power line and activate the indicator, there may be an electrical failure downstream that prevents power from reaching the drive mechanism to drive the auger. That is, the indicator in that situation would falsely indicate that the auger is operating, which is avoided by the present embodiment's pick-off points 200 and 202. While the points 200 and 202 might be located at various distances from the pump—and 200 may even be a direct connection located on the pump—they are adjacent to the pump and remote from the upstream controller 94 and associated electronics that convert the signal from the command signal line 92.

It is to be understood that the above disclosed embodiments of the sensor and the systems used for providing indications of auger operation described above should not be seen as limiting the scope of the invention. Any form of sensor or switch capable of being configured to sense auger operation is considered part of the invention. The sensor could be a manual switch operated by the auger operator, associated with switches used to operate the auger, associated with the drive system to determine when the shaft is in operation, rotational sensors, flow meters, voltage or currents sensors, etc. Systems for notifying a remote user of auger operation are also not limited to those described above. The indicator may take any form, including but not limited to, visual, aural, wireless transmissions. In the case of wireless transmissions, the system may use infrared, RF, BlueTooth, WI-FI, satellite, or other forms of wireless communication.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for providing an indication to a remote location relating to operation of an auger associated with a harvesting combine, the system comprising:
    a harvesting combine for harvesting grain from a field;
    an auger for off loading the grain from the harvesting combine, the auger comprising a helical shaft located in a housing;
    a drive system that mechanically drives operation of the auger to thereby rotate the helical shaft;

a controller operatively coupled to the drive system for controlling operation of the drive system;

a power line connected between the controller and the drive system for providing power to the drive system;

wherein the drive system comprises:
   a pump connected to the power line;
   a hydraulic cylinder connected to and controlled by the pump;
   a pulley connected to the hydraulic cylinder; and
   a belt that drives the helical shaft of the auger and is engaged by the pulley when the pump activates the hydraulic cylinder; and an indicator electrically connected to the power line, wherein the indicator's connection to the power line is at a position adjacent to the drive system and at a position such that there are no switches between the connection point of the indicator to the power line and the connection of the power line to the pump, wherein power provided by the power line provides power to both the pump of the drive system and the indicator at the same time, thereby actuating both the pump of the drive system and the indicator, wherein activation of the indicator indicates when power is supplied to the pump of the drive system and the helical shaft of the auger of the drive system is in operation.

2. A system according to claim 1, further comprising:
operator controls and associated electronics connected to the controller via a command line, wherein the connection between the indicator and the first power line is remote from the operator controls.

3. A system according to claim 2, wherein the operator controls includes a device that is selected from the group consisting of: wheel, joystick, button, lever, dial and switch.

4. A system according to claim 1, wherein the drive system further comprises a solenoid switch located on the power line such that it is located between the controller and the connection point of the indicator to the power line.

5. A system according to claim 1, wherein the indicator is selected from the group consisting of: visual indicator, audio indicator and electromagnetic transmitter.

6. A system according to claim 1, wherein the indicator is connected to the power line in parallel with the pump of the drive system.

* * * * *